(12) United States Patent
Pankaj et al.

(10) Patent No.: US 11,533,844 B2
(45) Date of Patent: Dec. 27, 2022

(54) LOAD BASED GROUND SPEED CONTROL METHOD

(71) Applicant: CNH Industrial America LLC, New Holland, PA (US)

(72) Inventors: Madhu Pankaj, West Chester, PA (US); Robert L. Fackler, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 371 days.

(21) Appl. No.: 16/777,931

(22) Filed: Jan. 31, 2020

(65) Prior Publication Data

US 2021/0235621 A1 Aug. 5, 2021

(51) Int. Cl.
*A01D 41/127* (2006.01)
*G05D 1/02* (2020.01)
*A01D 69/03* (2006.01)

(52) U.S. Cl.
CPC ......... *A01D 41/1274* (2013.01); *A01D 69/03* (2013.01); *G05D 1/0223* (2013.01)

(58) Field of Classification Search
CPC ... A01D 41/1274; A01D 69/03; G05D 1/0223
See application file for complete search history.

(56) References Cited

U.S. PATENT DOCUMENTS

| | | | |
|---|---|---|---|
| 3,469,381 A * | 9/1969 | Burrough | A01D 41/1274 180/6.3 |
| 4,487,002 A | 12/1984 | Kruse et al. | |
| 4,704,866 A * | 11/1987 | Myers | F16H 61/47 60/449 |
| 5,704,200 A * | 1/1998 | Chmielewski, Jr. | A01D 41/141 56/DIG. 15 |
| 6,587,771 B2 * | 7/2003 | Panoushek | A01D 41/1274 701/50 |
| 6,951,514 B1 | 10/2005 | Coers et al. | |
| 7,849,952 B2 * | 12/2010 | MacGregor | B60W 10/103 180/308 |
| 9,089,092 B2 | 7/2015 | Diekhans et al. | |
| 9,097,340 B2 * | 8/2015 | Ohkubo | F04B 1/324 |
| 9,485,905 B2 | 11/2016 | Jung et al. | |
| 9,668,419 B2 * | 6/2017 | Soldan | A01D 41/127 |
| 9,815,479 B2 * | 11/2017 | Stander | B60P 1/162 |
| 10,253,703 B2 * | 4/2019 | Byttebier | B60W 30/188 |
| 10,302,027 B2 * | 5/2019 | Hansen | F15B 21/08 |
| 10,791,673 B2 * | 10/2020 | Schmoening | A01F 29/14 |

(Continued)

FOREIGN PATENT DOCUMENTS

EP 0914765 A1 5/1999

*Primary Examiner* — Luis A Martinez Borrero
(74) *Attorney, Agent, or Firm* — Peter Zacharias; Patrick Sheldrake

(57) ABSTRACT

Methods for autonomous operation of harvesters use header drive pump displacement, header speed, harvester ground speed, engine load and engine speed to control and maximize harvester operation under varying conditions such as crop type, crop condition and terrain. Adaptive learning processes within the methods relate the parameters of pump displacement with header speed and engine speed during harvester operation to permit the control system to establish combinations of related control parameters which are used by a control system to control harvester operation.

32 Claims, 4 Drawing Sheets

(56) References Cited

U.S. PATENT DOCUMENTS

| | | | |
|---|---|---|---|
| 2003/0093202 A1* | 5/2003 | Panoushek | A01D 41/1274 701/50 |
| 2007/0012011 A1* | 1/2007 | Strosser | A01D 34/40 56/10.2 R |
| 2007/0012013 A1* | 1/2007 | Strosser | A01D 41/14 56/1 |
| 2008/0047245 A1* | 2/2008 | MacGregor | A01D 69/00 56/10.8 |
| 2010/0307219 A1* | 12/2010 | Fackler | A01D 57/20 73/1.16 |
| 2014/0138166 A1* | 5/2014 | Otto | B62D 11/04 180/6.48 |
| 2017/0000030 A1* | 1/2017 | Soldan | A01D 41/1274 |
| 2018/0209357 A1* | 7/2018 | Byttebier | A01D 41/127 |
| 2018/0213721 A1* | 8/2018 | Schmoening | A01D 41/1274 |
| 2019/0183048 A1* | 6/2019 | Flintoft | A01D 34/246 |
| 2020/0260646 A1* | 8/2020 | Fasick | A01D 41/06 |
| 2020/0375092 A1* | 12/2020 | Pankaj | A01D 34/54 |
| 2020/0385054 A1* | 12/2020 | Ehrhart | F04B 1/324 |

\* cited by examiner

LOAD BASED GROUND SPEED CONTROL METHOD

FIELD OF THE INVENTION

This invention concerns methods for controlling the ground speed of agricultural vehicles such as harvesters and apparatus for implementing such methods.

BACKGROUND

The maximum speed at which a harvester, such as a self-propelled windrower, is able to operate while cutting crop in the field is limited by the engine load, the terrain, the type of crop, crop conditions and the ability of the header to cut the crop satisfactorily at that speed. When the harvester is under the control of a human operator the operator must account for all of these factors and adjust the harvester's ground speed to maintain an acceptable quality cut without allowing the engine to stall or exceed its red-line speed limit. It is difficult for a human operator, relying only on judgement and experience, to balance all of the operational factors and consistently achieve maximum productivity, i.e., maintain maximum speed at which an acceptable cut quality is possible while also operating the harvester within its acceptable operating parameters. It would be advantageous to operate the harvester autonomously, based upon actual measured operational parameters, thereby eliminating the human factor and more consistently achieve maximum productivity.

SUMMARY

This invention concerns a method and control system for controlling a ground speed of an engine driven harvester. The harvester includes a header for cutting crop. The header is powered by a hydraulic pump. In one example embodiment, the method comprises:
  establishing a maximum engine load;
  establishing a maximum ground speed;
  establishing a minimum ground speed;
  establishing a desired header speed;
  measuring a current ground speed;
  measuring a current engine load;
  comparing the current engine load with the maximum engine load;
  decreasing the current ground speed if the current engine load is greater than the maximum engine load;
  measuring a current engine speed;
  measuring a current header speed;
  establishing a maximum pump displacement;
  measuring a current pump displacement;
  comparing the current pump displacement with the maximum pump displacement;
  decreasing the current ground speed if the current pump displacement is greater than the maximum pump displacement;
  comparing the current header speed with the desired header speed;
  decreasing the current ground speed if the current header speed is less than the desired header speed;
  comparing the current ground speed with the maximum ground speed;
  decreasing the current ground speed if the current ground speed is greater than the maximum ground speed;
  increasing the current ground speed if the current ground speed is less than the maximum ground speed.

An example of the method may include steps wherein the comparing the current engine load with the maximum engine load comprises comparing a current output torque of the engine with a maximum available torque at the current engine speed.

As an example, the method may include steps wherein the desired header speed is established based upon at least one of a type of the crop and a condition of the crop.

An example of the method may include steps wherein the establishing a maximum engine load comprises selecting a fraction of a maximum available torque for a plurality of engine speeds.

As an example, the method may include steps wherein the maximum pump displacement is established as a function of the current engine speed and the current header speed.

An example of the method may include steps wherein the current pump displacement is measured using a parameter selected from the group consisting of a swashplate angle of the pump, a swashplate actuator voltage, a swashplate actuator current and combinations thereof.

As an example, the method may include steps wherein the current ground speed is decreased in a sequence of steps over a time interval when the current engine load is greater than the maximum engine load. In a particular example, the method may include steps wherein the current ground speed is decreased the same amount for each step. In another particular example, the method may include steps wherein the current ground speed is decreased in proportion to the difference between the current engine load and the maximum engine load.

An example of the method may include steps wherein the current ground speed is decreased in a sequence of steps over a time interval when the current pump displacement is greater than the maximum pump displacement. In a particular example, the method may include steps wherein the current ground speed is decreased the same amount for each step. In another particular example, the method may include steps wherein the current ground speed is decreased in proportion to the difference between the current pump displacement and the maximum pump displacement.

As an example, the method may include steps wherein the current ground speed is decreased in a sequence of steps over a time interval when the current header speed is less than the desired header speed. In a particular example, the method may include steps wherein the current ground speed is decreased the same amount for each step. In another particular example, the method may include steps wherein the current ground speed is decreased in proportion to the difference between the current header speed and the desired header speed.

An example of the method may include steps wherein the current ground speed is decreased in a sequence of steps over a time interval when the current ground speed is greater than the maximum ground speed. In a particular example, the method may include steps wherein the current ground speed is decreased the same amount for each step. In another particular example, the method may include steps wherein the current ground speed is decreased in proportion to the difference between the current ground speed and the maximum ground speed.

As an example, the method may include steps wherein the current ground speed is increased in a sequence of steps over a time interval when the current ground speed is less than the maximum ground speed. In a particular example, the method may include steps wherein the current ground speed is increased the same amount for each step. In another particular example, the method may include steps wherein the current ground speed is increased in proportion to the difference between the current ground speed and the maximum ground speed.

An example method may further comprise:
establishing a correspondence table relating the maximum pump displacement with a header speed and an engine speed;
establishing a range of desired header speeds;
establishing a range of permitted engine speeds; wherein for each time a desired header speed is achieved within the range of desired header speeds, and, with the current engine speed being within the range of permitted engine speeds, measuring the current pump displacement; and
associating the desired header speed and the current engine speed with the current pump displacement in the correspondence table.

An example of the method may include steps wherein measuring the current pump displacement is effected by measuring a parameter selected from the group consisting of a swashplate angle of the pump, a swashplate actuator voltage, a swashplate actuator current and combinations thereof. In a particular example, the method may further comprise decreasing the current ground speed when the current pump displacement is greater than the maximum pump displacement associated with the desired header speed and the current engine speed in the correspondence table.

This invention concerns a control system for controlling a ground speed of an engine driven harvester comprising a header for cutting crop. The header is powered by a hydraulic pump. One example embodiment of the control systems comprises a controller. A control interface is adapted to receive control inputs from an operator and transmit the control inputs to the controller. An engine speed sensor is adapted to generate signals indicative of engine speed and transmit the signals to the controller. An engine load sensor is adapted to generate signals indicative of engine load and transmit the signals to the controller. A header speed sensor is adapted to generate signals indicative of header speed and transmit the signals to the controller. A pump displacement sensor is adapted to generate signals indicative of pump displacement and transmit the signals to the controller. An engine speed actuator is adapted to receive signals from the controller and change the engine speed in response thereto. A header speed actuator is adapted to receive signals from the controller and change the header speed in response thereto. A pump displacement actuator is adapted to receive signals from the controller and change the pump displacement in response thereto.

In an example, the control inputs comprise a maximum engine load, a maximum ground speed, a minimum ground speed, and a desired header speed. In a particular example, the controller is adapted to receive the signals from the engine speed sensor, the engine load sensor, the header speed sensor, the pump displacement sensor and use the signals and the control inputs to decrease and increase the ground speed according to a control method executed by the controller.

As an example, the controller is adapted to establish a correspondence table relating the pump displacement with the header speed and the engine speed by recording, for each time a desired header speed is achieved within a range of desired header speeds and for an engine speed within a range of permitted engine speeds, the pump displacement, the desired header speed and the engine speed.

In an example, the pump displacement sensor is selected from the group consisting of a current sensor sensing an electrical current through a swashplate actuator, and a voltage sensor sensing an electrical potential of a swashplate actuator.

This invention also concerns a harvester comprising a chassis, a motive drive system, a header, a header drive system, and a control system. The chassis has an engine and a plurality of wheels mounted thereon. The motive drive system is operatively connecting the engine with at least one of the wheels for rotation thereof. The header is attached to the chassis, and has rotating cutter elements. The header drive system operatively connects the engine with the header for rotation of the rotating cutter elements, and comprises a hydraulic pump. The control system comprises a controller adapted to increase and decrease a ground speed of the harvester in response to an engine speed, an engine load, a header speed, a current ground speed and a displacement of the hydraulic pump.

As an example, the control system further comprises a control interface, an engine speed sensor, an engine load sensor, a header speed sensor, a pump displacement sensor, an engine speed actuator, a header speed actuator, and a pump displacement actuator. The control interface is adapted to receive control inputs from an operator and transmit the control inputs to the controller. The engine speed sensor is adapted to generate signals indicative of engine speed and transmit the signals to the controller. The engine load sensor is adapted to generate signals indicative of engine load and transmit the signals to the controller. The header speed sensor is adapted to generate signals indicative of header speed and transmit the signals to the controller. The pump displacement sensor is adapted to generate signals indicative of pump displacement and transmit the signals to the controller. The engine speed actuator is adapted to receive signals from the controller and change the engine speed in response thereto. The header speed actuator is adapted to receive signals from the controller and change the header speed in response thereto. The pump displacement actuator is adapted to receive signals from the controller and change the pump displacement in response thereto.

As an example, the harvester further comprises a left and a right wheel, a left a left hydraulic motor, a right hydraulic motor, a left hydraulic pump, a right hydraulic pump, a left swashplate actuator, and a right swashplate actuator. The left wheel and the right wheels are disposed on opposite sides of the chassis. The left hydraulic motor is operatively associated with the left wheel, and the right hydraulic motor is operatively associated with the right wheel. The left and right hydraulic pumps are driven by the engine. The left hydraulic pump is operatively associated with the left hydraulic motor and has a left swashplate, and the right hydraulic pump is operatively associated with the right hydraulic motor and has a right swashplate. The left swashplate actuator is in communication with the controller for adjusting a left swashplate angle of the left swashplate and the right swashplate actuator in communication with the controller for adjusting a right swashplate angle of the right swashplate. The controller is adapted to adjust the rotational speeds of the left and right wheels using the left and right wheel actuators to increase and decrease the ground speed of the harvester pursuant to a control method executed by the controller.

DETAILED DESCRIPTION

Figure 1:
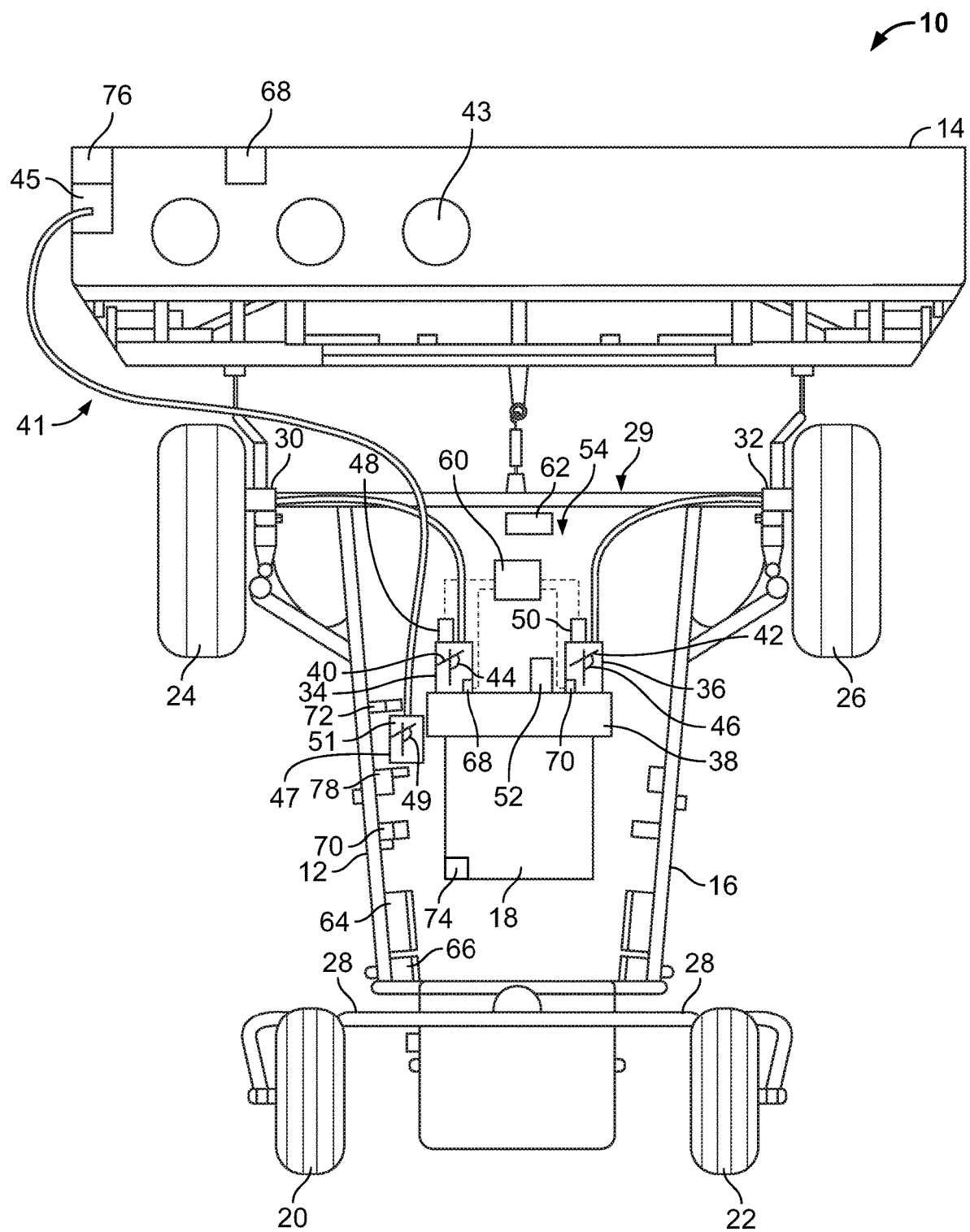
FIG. 1 is a plan schematic view of an example harvester according to the invention.

FIG. 1 shows an example harvester 10 according to the invention. Harvester 10 in this example comprises a tractor 12 on which a header 14 is mounted. Harvester 10 is differentially steered, and it is understood that the term "harvester" encompasses other types of differentially steered vehicles (tracked as well as wheeled vehicles) including self-propelled combines, windrowers, mowers and balers. Harvester 10 comprises a chassis 16 on which an engine 18 is mounted. A plurality of wheels, in this example 4 wheels 20, 22, 24 and 26, are also mounted on chassis 16. Wheels 20 and 22 are free wheeling and caster about respective caster axes 28 to follow Harvester 10 as it turns. Wheels 24 (left wheel) and 26 (right wheel) are driven and have angularly fixed axles, steering being effected by applying different torque to one wheel from the other thereby causing the wheel with the greater applied torque to rotate faster than the wheel having less applied torque, the turn being in the direction of the slower rotating wheel.

Motive power is provided by a motive drive system 29 which operatively connects the engine 18 with the driven wheels 24 and 26 mounted on chassis 16. In this example the motive drive system comprises a left hydraulic motor 30 operatively associated with and applying torque to the left wheel 24, and a right hydraulic motor 32 operatively associated with and applying torque to the right wheel 26, both motors mounted on the chassis 16. The left hydraulic motor 30 is driven by a left hydraulic pump 34 operatively associated with the left hydraulic motor and the right hydraulic motor 32 is driven by a right hydraulic pump 36 operatively associate with the right hydraulic motor. Both hydraulic pumps 34 and 36 are driven by engine 18 through a gear box 38 and may comprise axial piston pumps as in this example.

As is well understood, the output (pressure, volume rate of flow) from an axial piston pump is controlled by adjusting the angle of the pump's swashplate with respect to the pump shaft's axis of rotation. Larger swashplate angles produce greater pump output. Harvester 10 comprises a left swashplate 40 in the left hydraulic pump 34 and a right swashplate 42 in the right hydraulic pump 36. The left swashplate 40 is adjustable through a left swashplate angle 44 and the right swashplate 42 is adjustable through a right swashplate angle 46. In this example embodiment the left swashplate angle 44 is adjusted by a left swashplate actuator 48 and the right swashplate angle 46 is adjusted by a right swashplate actuator 50. Actuators 48 and 50 may be hydraulic actuators as in this example, driven by an actuator pump 52 by engine 18 through gear box 38.

Harvester 10 is propelled and also steered differentially by adjusting the left and right swashplate angles 44 and 46 of the left and right hydraulic pumps 34 and 36. When the left and right swashplate angles are equal and both pumps 34 and 36 are driven at the same speed, equal torque will be applied to the left and right wheels 24 and 26 via their respective left and right hydraulic motors 30 and 32. The left and right wheels 24 and 26 have the same rotational speed about their axes of rotation and the harvester 10 will move along a straight line. The ground speed of harvester 10 is proportional to the swashplate angle, with greater swashplate angles producing higher speeds. To turn to the left, the swashplate angles 44 and 46 are adjusted with respect to one another so that the right swashplate angle 46 is greater than the left swashplate angle 44. More hydraulic oil flows to the right hydraulic motor 32 and thus more torque is applied to the right wheel 26 which causes the right wheel 26 to rotate faster than the left wheel 24 and harvester 10 consequently turns to the left. To turn to the right, the swashplate angles are adjusted with respect to one another so that the left swashplate angle 44 is greater than the right swashplate angle 46. More hydraulic oil flows to the left hydraulic motor 30 and thus more torque is applied to the left wheel 24 which causes the left wheel 24 to rotate faster than the right wheel 26 and consequently harvester 10 turns to the right.

Operating power for header 14 is provided by a header drive system 41. In this example embodiment, rotating cutter elements 43 within the header 14 which cut the crop are driven by a hydraulic motor 45 mounted on the header. Hydraulic motor 45 is driven by a hydraulic pump 47, pump 47 being driven by engine 18 through gearbox 38. The header speed, being the rotational rate of the cutter elements 43, is determined by the angle 49 of the swashplate 51 of pump 47, with greater swashplate angles causing more flow to the hydraulic motor 45, thereby delivering more torque for higher speeds. The swashplate angle 49 is also referred to as the "displacement" of the pump 47 and is a good approximation of the amount of engine load devoted to rotating the cutter elements 43 of the header 14. Furthermore, the header speed provides an immediate indication of changing load conditions affecting harvester 10 and is thus a useful parameter for controlling various aspects of harvester operation, such as the ground speed of the harvester 10. As explained below, the header speed, as well as the displacement of the header drive pump 47 (and its surrogates), along with the engine load are used in a method according to the invention to automatically control the harvester ground speed without operator input.

Harvester 10 further comprises a control system 54. Control system 54 automatically controls (increases and decreases) the harvester's ground speed in response to the engine load, engine speed, header speed, current ground speed and the displacement of the hydraulic header drive pump 47. As shown in FIG. 1, control system 54 comprises a controller 60, for example a programmable logic controller or other microprocessor based computer mounted on chassis 16. Resident software on the controller provides algorithms to execute a control method for automatically controlling the ground speed of the harvester 10 according to the invention, for example, by adjusting the rotational speeds of the left and right wheels 24 and 26.

Further by way of example, control system 54 comprises various sensors and actuators including:

a control interface 62. Control interface 62 is advantageously mounted within the cab of harvester 10 and is adapted to receive control inputs (described below) from a human operator for both the harvester and the control system and transmit the control inputs to the controller 60. Practical examples of control interfaces include switches, which may be mechanical or touch screen displays providing interactive menus for selection of operating mode and input of control system parameters such as maximum engine load, maximum ground speed, minimum ground speed and desired header speed (described below);

an engine speed sensor 64 mounted on the harvester 10 and adapted to generate signals indicative of engine speed (crankshaft revolutions per unit time) and transmit the signals to the controller 60;

an engine load sensor 66 mounted on the harvester 10 and adapted to generate signals indicative of engine load (the ratio of the engine output torque to the maximum torque available at a given engine speed) and transmit the signals to the controller 60;

a header speed sensor 68 mounted on the header 14 or on the harvester 10 and adapted to generate signals indicative of header speed (rotation rate of rotating cutter elements 43) and transmit the signals to the controller 60;

a harvester speed sensor 70 for measuring the current ground speed of the harvester 10 and transmitting signals indicative of the speed to the controller 60;

a pump displacement sensor 72 mounted on the harvester 10 and adapted to generate signals indicative of the displacement of hydraulic pump 47 and transmit the signals to the controller 60. Pump displacement sensor 72 may function by measuring a surrogate parameter related to the pump displacement, such as a swash plate angle, a swashplate actuator voltage or current;

an engine speed actuator 74 mounted on the harvester 10 and adapted to receive signals from controller 60 and change the engine speed in response thereto;

a header speed actuator 76 mounted on the harvester 10 and adapted to receive signals from controller 60 and change the header speed in response thereto; and a header pump displacement actuator 78 mounted on the harvester 10 and adapted to receive signals from controller 60 and change the speed of header 14 in response thereto via header pump 47. Communication between the controller 60 and the various sensors and actuators may be via wires or wirelessly via radio frequency transmitters and receivers.

Operation of the harvester 10 by methods according to the invention depends upon proper characterization of the relationship between the displacement of the header hydraulic pump, the header speed and the engine speed. The maximum allowable displacement for each of these parameters is set within the controller 60. As the displacement of the header pump 47 required to achieve different header speeds at different engine speeds will vary depending on the particular header, pump and engine of the harvester 10, a machine learning algorithm is implemented within controller 60 so that the values of displacement of the header hydraulic pump, the header speed and the engine speed are modified each time the desired header speed is achieved within a given header speed range and a given engine speed range. As described by way of example below, the machine learning algorithm is effected by adapting the controller 60 to establish a correspondence table. The correspondence table relates the header pump displacement with the header speed and the engine speed by recording, in the controller, for each time a desired header speed is achieved within a range of desired header speeds, and, for an engine speed within a range of permitted engine speeds, the pump displacement, the desired header speed and the engine speed.

The invention also encompasses a method for autonomously controlling the ground speed of harvester 10, in view of the type of crop, the condition of the crop and the terrain, such that the harvester moves at the highest speed possible while maintaining acceptable crop cut quality and also operating within acceptable engine and pump parameter limits to maximize productivity without active operator input.

Figure 2:
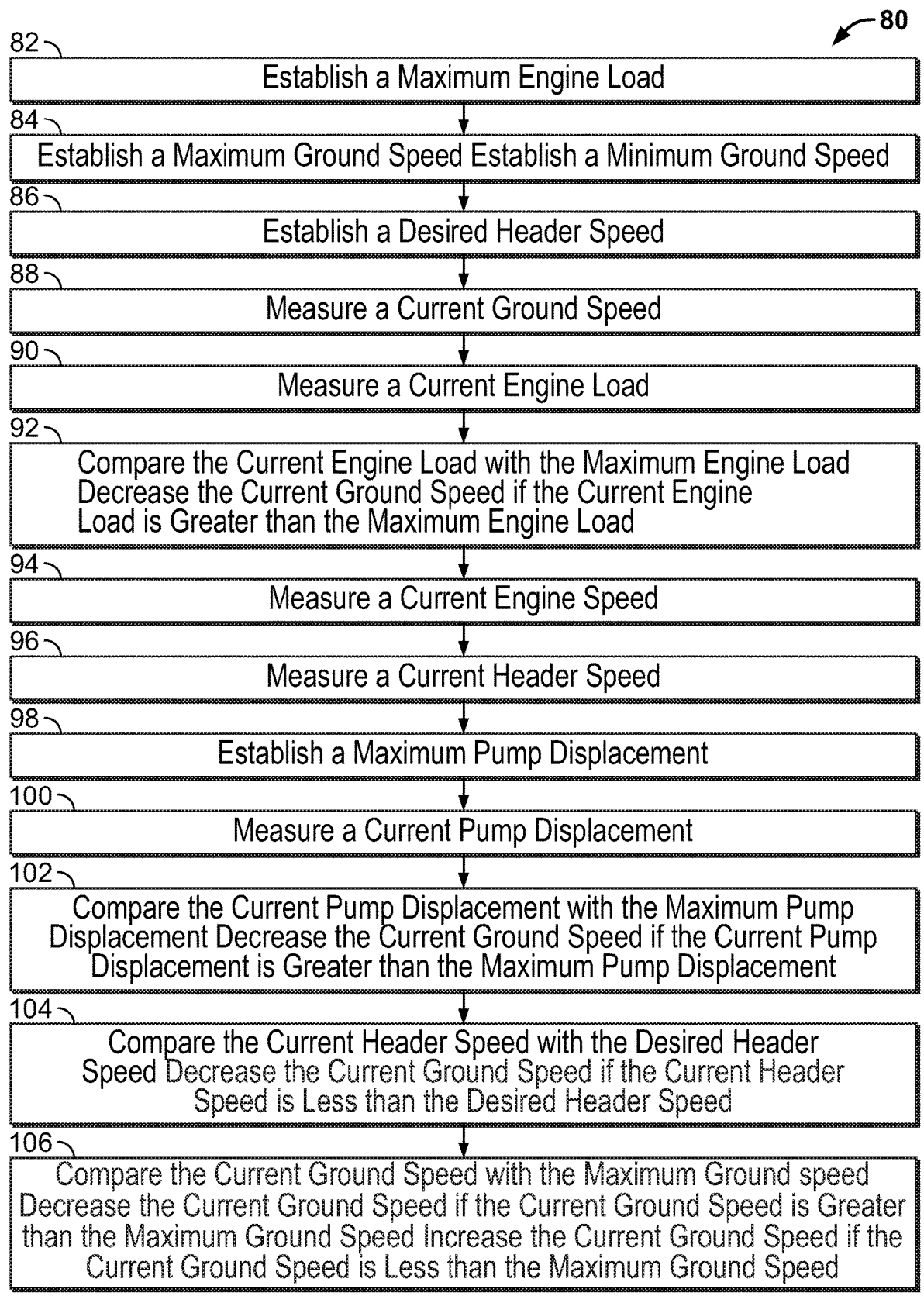
FIG. 2 is a flowchart depicting an example method of operating a harvester according to the invention.

FIG. 2 is a flowchart illustrating an example method 80 according to the invention. It is understood that the order in which the steps are presented is by way of example and does not reflect a required order. At step 82, a maximum engine load is established. This is done by the operator through the control interface 62 and entails defining, to the controller 60, an upper limit on the engine load (torque produced) as a fraction or percentage of the torque available at a plurality of engine speeds. The maximum engine load should be established to afford a reserve which will prevent the engine from stalling when conditions (terrain, crop conditions) change and place a greater demand on the engine. At step 84 maximum and minimum ground speeds are established by the operator inputting them into the controller. The ground speed range is based upon such considerations as the field conditions, the type of crop, the mechanical capabilities of the vehicle, and combination thereof. Step 86 entails establishing a desired header speed (the rotation rate of cutter elements 43). The desired header speed will depend upon the type of crop and its condition (wet, dry) as well as the cutting elements, and is selected to ensure acceptable cut quality.

At step 88 the current ground speed is measured by the speed sensor 70, which transmits this information to the controller 60. Similarly in step 90, the current engine load is measured by sensor 66 and communicated to controller 60. In step 92 the controller compares the current engine load with the maximum engine load and decreases the current ground speed (using engine speed actuator 74) if the current engine load is greater than the maximum engine load. This may entail, for example, comparing a current output torque of the engine with a maximum torque available at the current engine speed. The current ground speed may be decreased in a sequence of steps over a time interval when the current engine load is greater than the maximum engine load. The current ground speed may be decreased by the same amount for each step, or, the speed may be decreased in proportion to the difference between the current engine load and the maximum engine load.

At step 94 the current engine speed is measured (by engine speed sensor 64) and communicated to the controller 60. At step 96 a current header speed is measured and transmitted to the controller by sensor 68. The maximum pump displacement is established by the operator at step 98. The pump displacement refers to the swashplate angle of the hydraulic pump 47 driving the header 14 and is a good approximation of the amount of engine load devoted to rotating the cutter elements 43. The maximum pump displacement may be established as a function of the current engine speed and the current header speed.

Similar to the maximum engine speed, the maximum pump displacement is established with a reserve capacity to account for transient increases in demand due to changing conditions. A current pump displacement is measured (by sensor 72) in step 100. The current pump displacement may be measured using a parameter selected from the group consisting of a swashplate angle of the pump, a swashplate actuator voltage, a swashplate actuator current and combinations thereof. In step 102 the controller 60 compares the current pump displacement with the maximum pump displacement and decreases the current ground speed if the current pump displacement is greater than the maximum pump displacement. The current ground speed may be decreased in a sequence of steps over a time interval when the current pump displacement is greater than the maximum pump displacement. The current ground speed may be decreased by the same amount for each step, or, the speed may be decreased in proportion to the difference between the current pump displacement and the maximum pump displacement.

In step 104 the controller 60 compares the current header speed with the desired header speed and decreases the current ground speed if the current header speed is less than the desired header speed. The current ground speed may be decreased in a sequence of steps over a time interval when the current header speed is less than the desired header speed. The current ground speed may be decreased by the same amount for each step, or, the speed may be decreased in proportion to the difference between the current header speed and the desired header speed.

In step 106 the controller compares said current ground speed with the maximum ground speed and decreases the current ground speed if the current ground speed is greater than the maximum ground speed or increases the current ground speed if the current ground speed is less than the maximum ground speed. The current ground speed may be decreased in a sequence of steps over a time interval when the current ground speed is greater than the maximum ground speed. The current ground speed may be increased in a sequence of steps over a time interval when the current ground speed is less than the maximum ground speed. The current ground speed may be decreased or increased by the same amount for each step, or, the speed may be decreased or increased in proportion to the difference between the current ground speed and the maximum ground speed.

Figure 3:
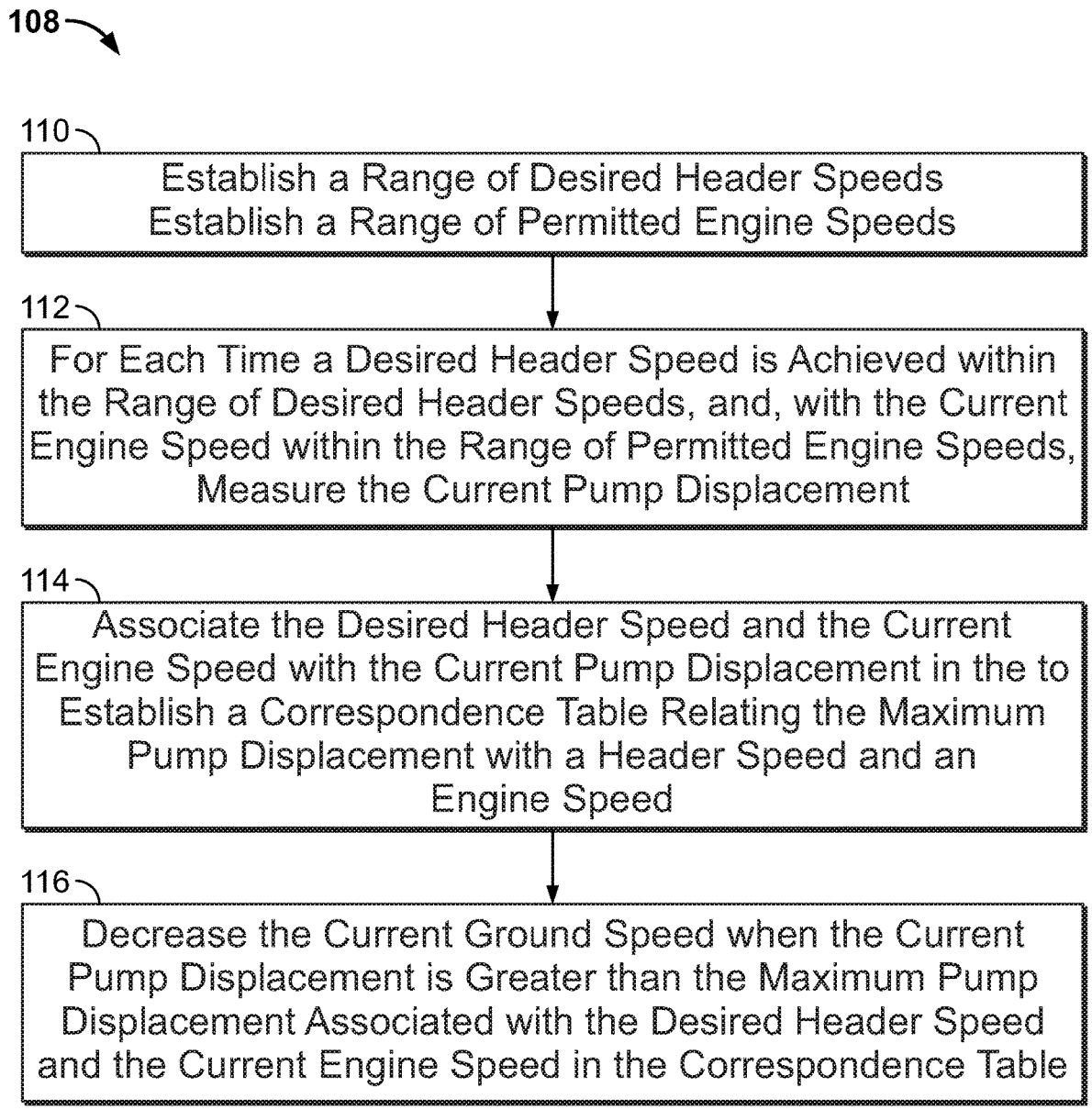
FIG. 3 is a flow chart depicting an example method of establishing a correspondence table associating operating parameters of a harvester for use in the control method of FIG. 2.

FIG. 3 is a flowchart describing the use of a machine learning algorithm for an adaptive speed control system 108. In step 110 a correspondence table relating the maximum pump displacement with a header speed and an engine speed is established by establishing a range of desired header speeds and establishing a range of permitted engine speeds. Then, as shown at 112, for each time a desired header speed is achieved within the range of desired header speeds during operation of the harvester, and the current engine speed is within said range of permitted engine speeds, the current pump displacement is measured. As shown at 114, the desired header speed and the current engine speed are then associated with the current pump displacement in the correspondence table. Measuring the current pump displacement may be effected by measuring a parameter selected from the group consisting of a swashplate angle of said pump, a swashplate actuator voltage, a swashplate actuator current and combinations thereof. As shown at 116, the current ground speed is decreased when the current pump displacement is greater than the maximum pump displacement associated with the desired header speed and the current engine speed in the correspondence table.

Figure 4:
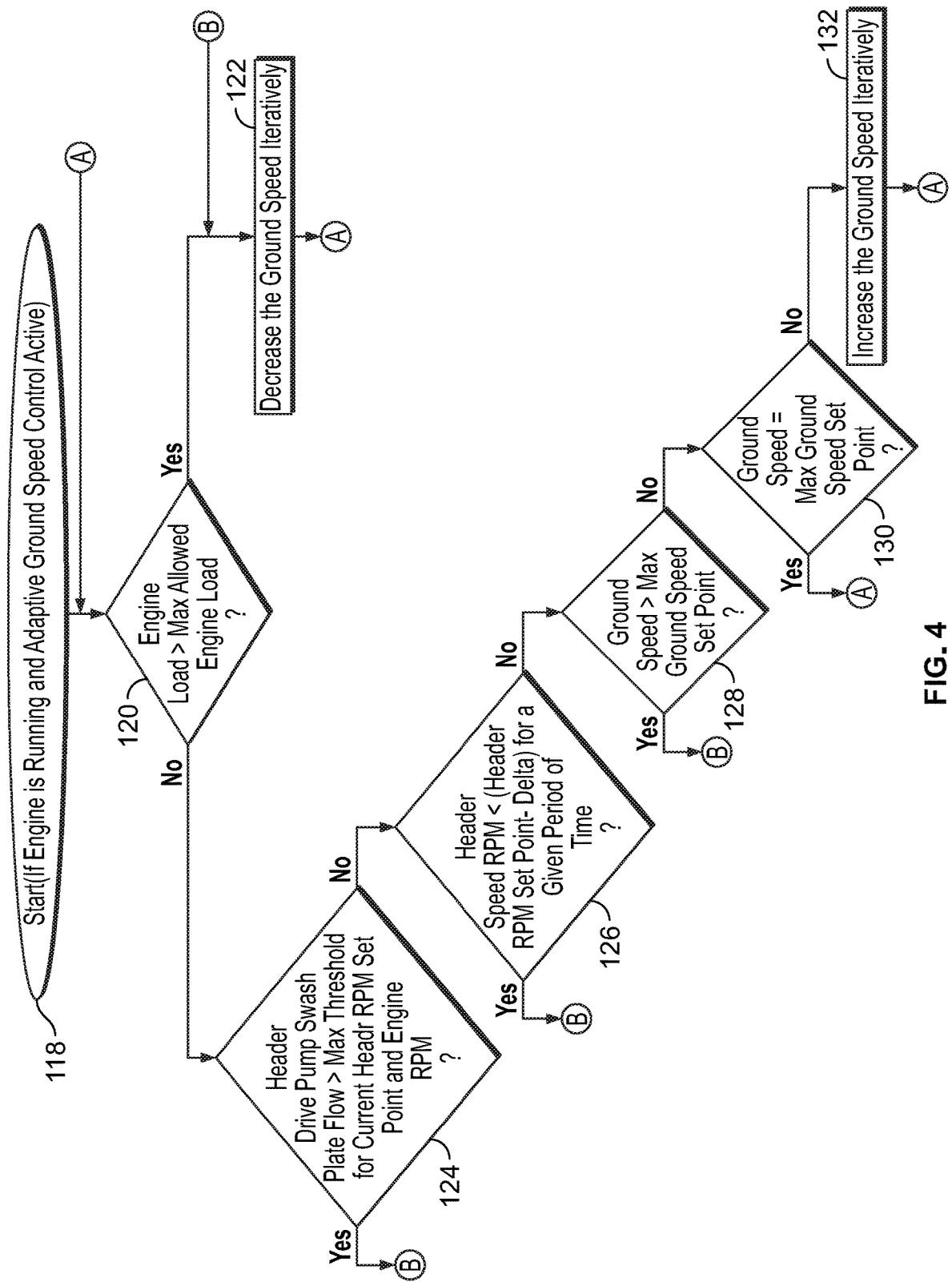
FIG. 4 is a flow chart depicting a specific implementation of an example method of harvester operation according to the invention.

FIG. 4 is a flowchart depicting a specific implementation of an example method of harvester operation according to the invention. With the ground speed control active (118) (engine 18 running, control system 54 on) the controller 60 compares the current engine load to the maximum engine load (120) and if the current engine load is greater the controller decreases the ground speed (122). The control system also compares the current header drive pump displacement to the maximum displacement for the current engine speed (124) and decreases the ground speed if the current displacement is greater than the maximum ground speed. Current header speed is also polled and compared with the desired header speed (126) and if the current header speed is less then the ground speed is decreased. The current ground speed is also compared with the maximum ground speed (128) and if the current ground speed is greater then the ground speed is decreased. If the current ground speed is less than the maximum ground speed (130) then the ground speed is increased (132).

It is expected that harvesters according to the invention operated using methods according to the invention will maximize efficiency while allowing the harvester to operate autonomously within its normal performance parameters.

What is claimed is:

1. A method for controlling a ground speed of an engine driven harvester comprising a header for cutting crop, said header powered by a hydraulic pump, said method comprising:
    establishing a maximum engine load;
    establishing a maximum ground speed;
    establishing a minimum ground speed;
    establishing a desired header speed;
    measuring a current ground speed;
    measuring a current engine load;
    comparing said current engine load with said maximum engine load;
    decreasing said current ground speed if said current engine load is greater than said maximum engine load;
    measuring a current engine speed;
    measuring a current header speed;
    establishing a maximum pump displacement;
    measuring a current pump displacement;
    comparing said current pump displacement with said maximum pump displacement;
    decreasing said current ground speed if said current pump displacement is greater than said maximum pump displacement;
    comparing said current header speed with said desired header speed;
    decreasing said current ground speed if said current header speed is less than said desired header speed;
    comparing said current ground speed with said maximum ground speed;
    decreasing said current ground speed if said current ground speed is greater than said maximum ground speed; and
    increasing said current ground speed if said current ground speed is less than said maximum ground speed.

2. The method according to claim 1, wherein said comparing said current engine load with said maximum engine load comprises comparing a current output torque of said engine with a maximum available torque at said current engine speed.

3. The method according to claim 1, wherein said establishing a desired header speed step includes establishing the desired header speed based upon at least one of a type of said crop and a condition of said crop.

4. The method according to claim 1, wherein said establishing a maximum engine load step comprises selecting a fraction of a maximum available torque for a plurality of engine speeds.

5. The method according to claim 1, wherein said establishing a maximum pump displacement step includes establishing the maximum pump displacement as a function of said current engine speed and said current header speed.

6. The method according to claim 1, wherein said measuring a current pump displacement step includes using a parameter selected from a group consisting of a swashplate angle of said pump, a swashplate actuator voltage, a swashplate actuator current and combinations thereof.

7. The method according to claim 1, further comprising the step of decreasing said current ground speed in a sequence of steps over a time interval when said current engine load is greater than said maximum engine load.

8. The method according to claim 7, wherein said current ground speed is decreased a same amount for each said step of the sequence of steps.

9. The method according to claim 7, wherein said current ground speed is decreased in proportion to a difference between said current engine load and said maximum engine load.

10. The method according to claim 1, further comprising the step of decreasing said current ground speed in a sequence of steps over a time interval when said current pump displacement is greater than said maximum pump displacement.

11. The method according to claim 10, wherein said current ground speed is decreased a same amount for each said step of the sequence of steps.

12. The method according to claim 10, wherein said current ground speed is decreased in proportion to a difference between said current pump displacement and said maximum pump displacement.

13. The method according to claim 1, further comprising the step of decreasing said current ground speed in a sequence of steps over a time interval when said current header speed is less than said desired header speed.

14. The method according to claim 13, wherein said current ground speed is decreased a same amount for each said step of the sequence of steps.

15. The method according to claim 13, wherein said current ground speed is decreased in proportion to a difference between said current header speed and said desired header speed.

16. The method according to claim 1, further comprising the step of decreasing said current ground speed in a sequence of steps over a time interval when said current ground speed is greater than said maximum ground speed.

17. The method according to claim 16, wherein said current ground speed is decreased a same amount for each said step of the sequence of steps.

18. The method according to claim 16, wherein said current ground speed is decreased in proportion to a difference between said current ground speed and said maximum ground speed.

19. The method according to claim 1, further comprising the step of increasing said current ground speed in a sequence of steps over a time interval when said current ground speed is less than said maximum ground speed.

20. The method according to claim 19, wherein said current ground speed is increased a same amount for each said step of the sequence of steps.

21. The method according to claim 19, wherein said current ground speed is increased in proportion to a difference between said current ground speed and said maximum ground speed.

22. The method according to claim 1, further comprising:
establishing a correspondence table relating said maximum pump displacement with a header speed and an engine speed;
establishing a range of desired header speeds;
establishing a range of permitted engine speeds; wherein for each time a desired header speed is achieved within said range of desired header speeds, and, with said current engine speed being within said range of permitted engine speeds, measuring said current pump displacement; and
associating said desired header speed and said current engine speed with said current pump displacement in said correspondence table.

23. The method according to claim 22, wherein measuring said current pump displacement is effected by measuring a parameter selected from a group consisting of a swashplate angle of said pump, a swashplate actuator voltage, a swashplate actuator current and combinations thereof.

24. The method according to claim 23, further comprising decreasing said current ground speed when said current pump displacement is greater than said maximum pump displacement associated with said desired header speed and said current engine speed in said correspondence table.

25. A control system for controlling a ground speed of an engine driven harvester comprising a header for cutting crop, said header powered by a hydraulic pump, said control system comprising:
a controller;
a control interface adapted to receive control inputs from an operator and transmit said control inputs to said controller;
an engine speed sensor adapted to generate signals indicative of engine speed and transmit said signals to said controller;
an engine load sensor adapted to generate signals indicative of engine load and transmit said signals to said controller;
a header speed sensor adapted to generate signals indicative of header speed and transmit said signals to said controller;
a pump displacement sensor adapted to generate signals indicative of pump displacement and transmit said signals to said controller;
an engine speed actuator adapted to receive signals from said controller and change said engine speed in response thereto;
a header speed actuator adapted to receive signals from said controller and change said header speed in response thereto; and
a pump displacement actuator adapted to receive signals from said controller and change said pump displacement in response thereto, the controller decreasing said ground speed if said header speed is less than a desired header speed.

26. The control system according to claim 25, wherein said control inputs comprise a maximum engine load, a maximum ground speed, a minimum ground speed, a desired header speed.

27. The control system according to claim 26, wherein said controller is adapted to receive said signals from said engine speed sensor, said engine load sensor, said header speed sensor, said pump displacement sensor and use said signals and said control inputs to decrease and increase said ground speed according to a control method executed by said controller.

28. The control system according to claim 25, wherein said controller is adapted to establish a correspondence table relating said pump displacement with said header speed and said engine speed by recording, for each time a desired header speed is achieved within a range of desired header speeds and for an engine speed within a range of permitted engine speeds, said pump displacement, said desired header speed and said engine speed.

29. The control system according to claim 25, wherein said pump displacement sensor is selected from a group consisting of a current sensor sensing an electrical current through a swashplate actuator, and a voltage sensor sensing an electrical potential of a swashplate actuator.

30. A harvester, said harvester comprising:
a chassis having an engine and a plurality of wheels mounted thereon;
a motive drive system operatively connecting said engine with at least one of said wheels for rotation thereof;
a header attached to said chassis, said header having rotating cutter elements;
a header drive system operatively connecting said engine with said header for rotation of said rotating cutter elements, said header drive system comprising a hydraulic pump; and
a control system comprising a controller adapted to increase and decrease a ground speed of said harvester in response to an engine speed, an engine load, a header speed, a current ground speed and a displacement of said hydraulic pump, the controller decreasing said current ground speed if said header speed is less than a desired header speed.

31. The harvester according to claim 30, wherein said control system further comprises:
a control interface adapted to receive control inputs from an operator and transmit said control inputs to said controller;
an engine speed sensor adapted to generate signals indicative of engine speed and transmit said signals to said controller;
an engine load sensor adapted to generate signals indicative of engine load and transmit said signals to said controller;
a header speed sensor adapted to generate signals indicative of header speed and transmit said signals to said controller;
a pump displacement sensor adapted to generate signals indicative of pump displacement and transmit said signals to said controller;
an engine speed actuator adapted to receive signals from said controller and change said engine speed in response thereto;
a header speed actuator adapted to receive signals from said controller and change said header speed in response thereto; and
a pump displacement actuator adapted to receive signals from said controller and change said pump displacement in response thereto.

32. The harvester according to claim 30, further comprising:
a left wheel and a right wheel disposed on opposite sides of said chassis;
a left hydraulic motor operatively associated with said left wheel;
a right hydraulic motor operatively associated with said right wheel;
a left hydraulic pump driven by said engine, said left hydraulic pump operatively associated with said left hydraulic motor and having a left swashplate;
a right hydraulic pump driven by said engine, said right hydraulic pump operatively associated with said right hydraulic motor and having a right swashplate;
a left swashplate actuator in communication with said controller for adjusting a left swashplate angle of said left swashplate; and
a right swashplate actuator in communication with said controller for adjusting a right swashplate angle of said right swashplate; wherein
said controller is adapted to adjust said rotational speeds of said left and right wheels using said left and right wheel actuators to increase and decrease said ground speed of said harvester pursuant to a control method executed by said controller.

* * * * *